United States Patent [19]

Ingram et al.

[11] Patent Number: 6,089,549
[45] Date of Patent: *Jul. 18, 2000

[54] EXCHANGE COLUMN STRUCTURED PACKING BED HAVING PACKING BRICKS

[75] Inventors: Lonnie L. Ingram, Braman, Okla.; Jason M. Nigg, Wichita, Kans.; Neil Yeoman, Merrick, N.Y.

[73] Assignee: Koch-Glitsch, Inc., Wichita, Kans.

[*] Notice: This patent issued on a continued prosecution application filed under 37 CFR 1.53(d), and is subject to the twenty year patent term provisions of 35 U.S.C. 154(a)(2).

[21] Appl. No.: 08/936,878

[22] Filed: Sep. 25, 1997

[51] Int. Cl.⁷ .................................. B01F 3/04; B01F 5/06
[52] U.S. Cl. .......................... 261/94; 261/112.2; 366/337
[58] Field of Search .................................. 366/181.5, 336, 366/337, 340; 48/189.4; 261/94, 95, 112.2, DIG. 72

[56] References Cited

U.S. PATENT DOCUMENTS

| | | | |
|---|---|---|---|
| 899,898 | 9/1908 | Petersen | 261/94 |
| 1,293,270 | 2/1919 | Webb | 261/95 |
| 2,055,162 | 9/1936 | Weber | 261/94 |
| 2,571,958 | 10/1951 | Slaughter et al. | 261/95 |
| 2,591,497 | 4/1952 | Berl | 261/95 |
| 2,986,379 | 5/1961 | Kramig, Jr. | 261/112.2 |
| 3,285,587 | 11/1966 | Huber | 261/112.2 |
| 3,785,620 | 1/1974 | Huber | 366/337 |
| 3,983,190 | 9/1976 | Norback | 261/112.2 |
| 4,290,980 | 9/1981 | Pikon et al. | 261/94 |
| 4,310,475 | 1/1982 | Leva | 261/94 |
| 4,541,967 | 9/1985 | Masaki | |
| 4,919,541 | 4/1990 | Grosz-Roell et al. | 366/337 |
| 5,320,428 | 6/1994 | Straiff | |
| 5,709,468 | 1/1998 | Woerheide et al. | |
| 5,749,651 | 5/1998 | Huttenhofer et al. | |

FOREIGN PATENT DOCUMENTS

| | | |
|---|---|---|
| 0 361 225 | 4/1990 | European Pat. Off. |
| 209 681 | 5/1909 | Germany |
| 161 066 | 9/1984 | Germany |
| 02086527 | 4/1990 | U.S.S.R. |
| 1 560 305 | 4/1990 | U.S.S.R. |
| 91/16970 | 11/1991 | WIPO |

*Primary Examiner*—Charles E. Cooley
*Attorney, Agent, or Firm*—Shook, Hardy & Bacon L.L.P.

[57] ABSTRACT

A plurality of structured packing bricks are positioned in a column having a longitudinal axis to form one or more structured packing beds. Each brick is formed from a plurality of corrugated plates disposed in parallel relation and having opposed ends that form end surfaces of the bricks. At least one end surface, and normally both end surfaces, of the bricks are inclined at an angle to the column axis so each brick has an end surface that engages and overlaps the inclined end surface of a horizontally adjacent brick. The inclined end surfaces include openings formed by the plate corrugations and, due to the overlapping positioning of adjacent end surfaces, liquid is able to flow vertically downwardly from openings in one brick end surface into openings in the adjacent brick end surface. These angle end surfaces also disrupt the vertical flow of vapor so that vertical channeling of vapor along the end surfaces is disrupted. The shape of the packing bricks can include trapezoidal and parallelogram.

19 Claims, 2 Drawing Sheets

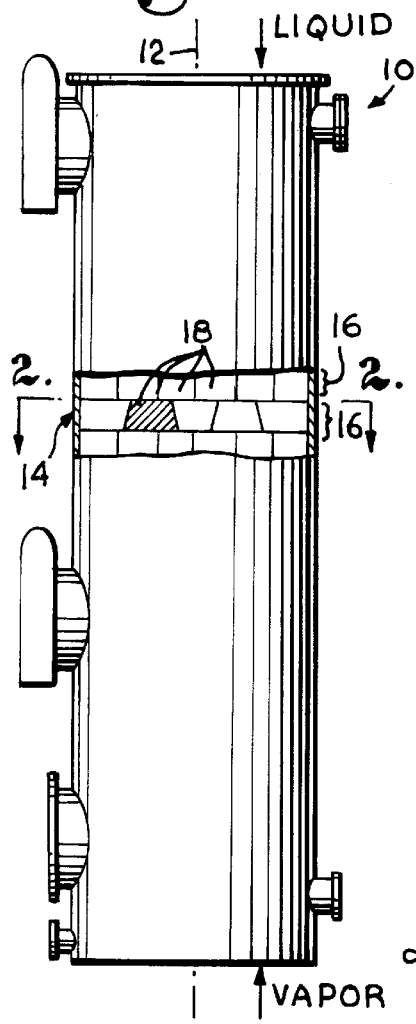
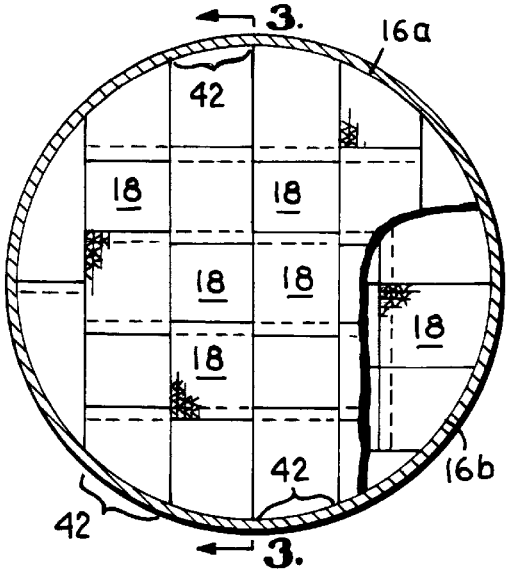
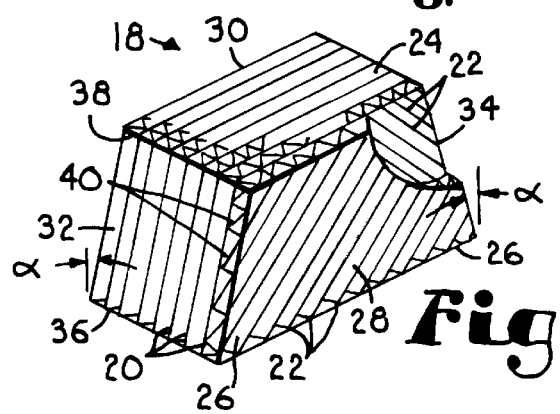
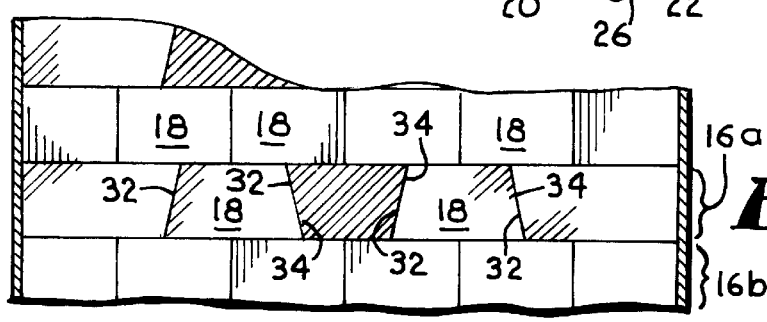

EXCHANGE COLUMN STRUCTURED PACKING BED HAVING PACKING BRICKS

BACKGROUND OF THE INVENTION

This invention relates to mass transfer devices for an exchange column and, more particularly, to structured packing elements used for facilitating mass transfer between fluid streams flowing within the column.

In various types of exchange columns, gas and liquid streams or two liquid streams are contacted with one another to effect mass transfer between the fluids. In many instances, structured packing elements formed of corrugated plates are used to facilitate contact between the fluids for enhanced mass transfer. These plates are typically positioned parallel to the column axis and are arranged so that the corrugations of each plate are disposed at an angle to the column axis. The corrugations of each plate also extend at an angle to and are in contact with the corrugations of adjacent plates to create inclined flow channels for the fluid streams. Typically, the vertically extending plates fill the horizontal cross section of the column and multiple layers of these plates may be used to fill the desired vertical dimension within the column. If multiple layer of plates are used, the plates in adjacent layers are rotated with respect to one another to enhance the radial or lateral distribution and mixing of the fluid streams.

To facilitate fabrication and installation of the corrugated plates described above in exchange columns, particularly those columns having a large diameter, bundles or "bricks" of plates are assembled together and are positioned in side by side relationship to fill the horizontal cross section of the column. The plates in each brick are held together in various fashions such as by mesh banding around the plates, welding, or pins inserted through the plates. The bricks are generally six-sided and have differing shapes dictated by the size of the brick in relation to the cross-sectional dimension of the column, the shape of the column and the intended placement position within the column. Those bricks positioned centrally within the cross section of the column will normally have a cubic or rectangular shape while those bricks adjacent the column wall will be shaped to conform to the shape of the column wall. For example, in cylindrical columns, the outer perimeter bricks will have at least one curved end or side to conform to the curved shape of the column. The curved end of the brick is formed by using plates with progressively shorter widths. In some bricks, one end of the plates lies in a common vertical plane while the opposite end of the plates forms a curve to approximate the shape of the column wall. In other bricks, both ends form curved surfaces.

While the use of the packing brick construction has greatly eased the fabrication and installation of corrugated plates in exchange columns, the separation efficiency of these plates may suffer because of less than desired communication of liquid streams between the ends of adjacent bricks. Efficiency may further suffer as a result of vapor streams bypassing the desired flow paths and passing upwardly along the vertical gaps which may form between the vertical ends of adjacent bricks. A need has thus developed for a structured packing brick having increased separation efficiency.

SUMMARY OF THE INVENTION

Accordingly, it is an object of the present invention to provide a packing brick construction which reduces the efficiency losses associated with utilization of such packing bricks.

Another object of this invention is to provide a packing bed constructed of individual packing bricks which allow ease of installation while at the same time maintaining the overall efficiency of the column.

A further object of this invention is to provide a shape for a packing brick which allows increased transfer of liquid between horizontally adjacent bricks, and further diverts the path of upwardly flowing vapor between adjacent bricks, such that contact between vapor and liquid is increased.

Accordingly, the present invention provides for a structured packing brick for positioning in a column having a longitudinal axis. The brick includes a plurality of corrugated plates disposed in parallel relation. The plurality of plates defines at least one end surface for engaging the end surface of a horizontally adjacent brick. The end surface of the brick is disposed at an angle with respect to the column longitudinal axis.

Additional objects, advantages, and novel features of the invention will be set forth in part in the description which follows, and in part will become apparent to those skilled in the art upon examination of the following, or may be learned by practice of the invention.

BRIEF DESCRIPTION OF THE DRAWINGS

In the accompanying drawings which form a part of this specification and are to be read in conjunction therewith and in which like reference numerals are used to indicate like parts in the various views:

FIG. 1 is a fragmentary side elevation view of a mass transfer column utilizing the packing bricks of the present invention, parts being broken away and shown in cross section to show details of construction;

FIG. 2 is a top plan view taken in horizontal cross section along line 2—2 of FIG. 1 showing generally a packing bed layer composed of the packing bricks of the present invention, with the lower end edges of the bricks shown in broken lines, and portions of the layer broken away to show the details of construction of a lower layer of packing bricks;

FIG. 3 is a fragmentary side elevation view taken in vertical cross section along line 3—3 of FIG. 2 showing multiple packing bed layers, each of the layers composed of the inventive packing brick;

FIG. 4 is a top perspective view of a single inventive packing brick, one plate of the brick packing broken away to show the crisscrossing orientation of the corrugations in adjacent plates;

DETAILED DESCRIPTION OF THE PREFERRED EMBODIMENTS

Figure 5:
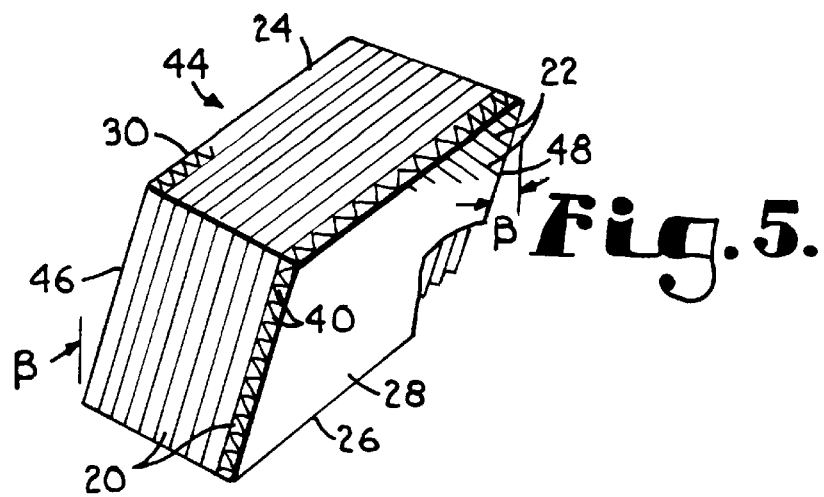
FIG. 5 is a top perspective of an alternative embodiment of the inventive packing brick, one plate of the brick partially broken away to show the crisscrossing corrugation orientation.

Referring to the drawings in greater detail, and initially to FIG. 1, an exchange column designated generally by the numeral 10 is shown. Column 10 is a generally cylindrical structure with a vertical longitudinal axis 12. Generally, during a mass transfer or heat exchange process, one or more liquid streams flow downwardly and one or more vapor streams flow upwardly through the column as indicated in FIG. 1. Positioned within column 10 is a structured packing bed 14 which provides surfaces upon which an exchange can take place between the downwardly flowing liquid and the upwardly flowing vapor. Packing bed 14 is constructed of a plurality of vertically disposed layers 16. Each layer 16 is in turn comprised of a plurality of structured packing bricks 18.

With reference to FIG. 4, each brick 18 includes a plurality of generally parallel, vertically disposed plates 20. In particular, each plate 20 is generally parallel to the longitudinal axis 12 of column 10. Each plate 20 further has a plurality of corrugations or folds 22 formed therein. The corrugations 22 of each plate are generally at an angle with respect to axis 12. Further, as best shown in FIG. 4 in the broken away portion, the corrugations of each plate 20 contact and are in a crisscrossing relationship to the corrugations of an adjacent plate. Plates 20 of bricks 18 are held together by any suitable means, such as pins, bolts, rivets, welding, soldering, or mesh banding as is well-known in the art. Further, plates 20 can be made of any suitable material such as sheet metal, ceramics, or polymers that can withstand the conditions within the column and is compatible with the fluid streams. Each brick 18 includes generally horizontal upper and lower surfaces 24 and 26, generally vertical side surfaces 28 and 30, and end surfaces 32 and 34. Depending upon the intended placement of brick 18, one or both end surfaces 32 and 34 are angled generally inwardly from a lower edge 36 toward an upper edge 38. As best shown in FIG. 3, the angled end surfaces 32 and 34 generally result in bricks 18 having a trapezoidal shape in vertical cross section. Each end surface 32 and 34 has corrugation end openings 40 formed thereon. In particular, openings 40 are where at least some of the corrugations on plates 20 begin or end.

With reference to FIGS. 2 and 3, the construction of packing bed 14 utilizing bricks 18 will be described. It is advantageous to position bricks 18 in layers 16. Each layer 16 is made of side-by-side rows 42 of bricks 18, as shown in FIG. 2. Each row 42 is made of bricks 18 disposed in end-to-end fashion, as best shown in FIG. 3. In particular, the angled end surfaces 32 and 34 of each brick 18 engage the angled end surfaces 32 and 34 of an adjacent brick, which is positioned in an upside down orientation. Therefore, in each row 42 bricks 18 are positioned in an end-to-end fashion and in an alternating right side up, upside down orientation. This orientation permits mating and helps ensure close contact between the overlapping angled end surfaces 32, 34 of adjacent bricks. Bricks in adjacent rows are also positioned in an alternating right side up, upside down orientation, as best shown in FIG. 2, so that the alternating orientation is formed within each row and across adjacent rows. This pattern helps to facilitate more uniform radial distribution of the downward flowing liquid. The bricks 18 within a layer 16 adjacent the curved outer shell of column 10 can be specially configured so that the entire cross section of the column is covered by bricks 18, as is shown in FIG. 2.

With reference to FIGS. 2 and 3, vertically adjacent layers 16 are rotated with respect to one another by an appropriate angle, which in this case is 90 degrees but could be other angles if desired. In particular, with reference to FIG. 2, layer 16a has plates 20 of each brick 18 extending in the same direction. Layer 16b which is below layer 16a has each of its plates in its bricks extending in a direction that is 90 degrees from the direction of the plates in layer 16a. Therefore, the layers above and below each layer 16 are rotated in this fashion to create an alternating flow pattern.

With reference to FIG. 3, the end-to-end arrangement with the angled end surfaces 32 and 34 results in openings 40 on an angled end surface of one block being vertically above openings 40 on an adjacent block. This arrangement allows the downwardly flowing fluid to more easily transfer to adjacent blocks due to gravity. Additionally, because the angled surfaces 32 and 34 are at an angle a to the longitudinal axis 12 of column 10, vapor flowing upwardly within column 10 is diverted from flowing directly upwardly due to the angled end surfaces.

The present invention involves the discovery that the vertical end surfaces of prior art bricks allowed vapor to take the path of least resistance (parallel to axis 12) between adjacent bricks. Further, the vertical end surfaces of prior art blocks resulted in liquid channeling between adjacent bricks. Therefore, the present invention of bricks 18 with overlapping angled end surfaces 32, 34 results in assured fluid transfer between horizontally adjacent bricks in a layer, and helps prevents channeling of the fluid between adjacent bricks. Further, because any vapor that flows between adjacent bricks now must flow at an angle to the longitudinal axis 12 of the column, the contact of the vapor with liquid is increased. Thus, the use of bricks with angled end surfaces positioned in the alternating fashion shown in FIG. 3 helps increase the efficiency of the column.

It has been found that to allow ease of installation of bricks 18, the angle a of the end surfaces 32, 34 with respect to axis 12 should be in the range of approximately 15 to 45 degrees. Larger angles, although more difficult to install, are also suitable and can provide greater increases in efficiency because of increased overlapping of the end surfaces. Smaller angles, although easier to install, may be less preferred because of smaller increases in efficiency due to the smaller amount of overlapping of the end surfaces.

The angle of inclination of the corrugations in plates 20 may also limit the increases in efficiencies obtainable with larger angles $\alpha$. In general, the corrugation angle will be in the range of approximately 15 to 45 degrees, and will typically be either 30 or 45 degrees. The upper end of the range for angle $\alpha$ will thus normally not exceed the corrugation angle. It will, of course, be appreciated that the angle $\alpha$ may exceed the corrugation angle in particular applications and still fall within the scope of the present invention.

Figure 6:
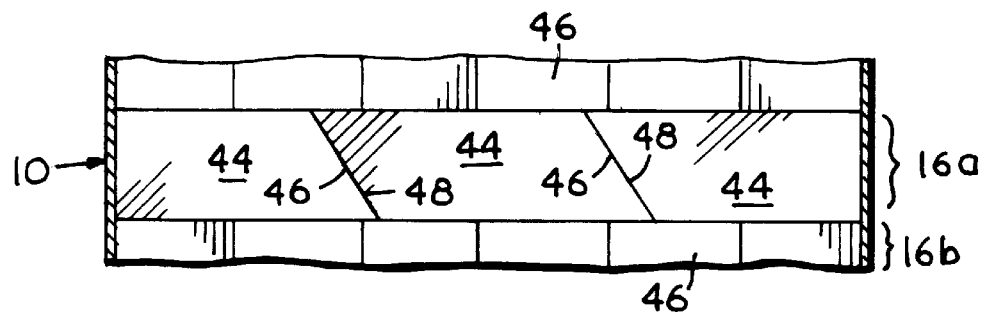
FIG. 6 is a cross-sectional view similar to FIG. 3, but showing the orientation and positioning of the alternative embodiment packing brick of FIG. 5 positioned within a layer of a column.
Figure 7:
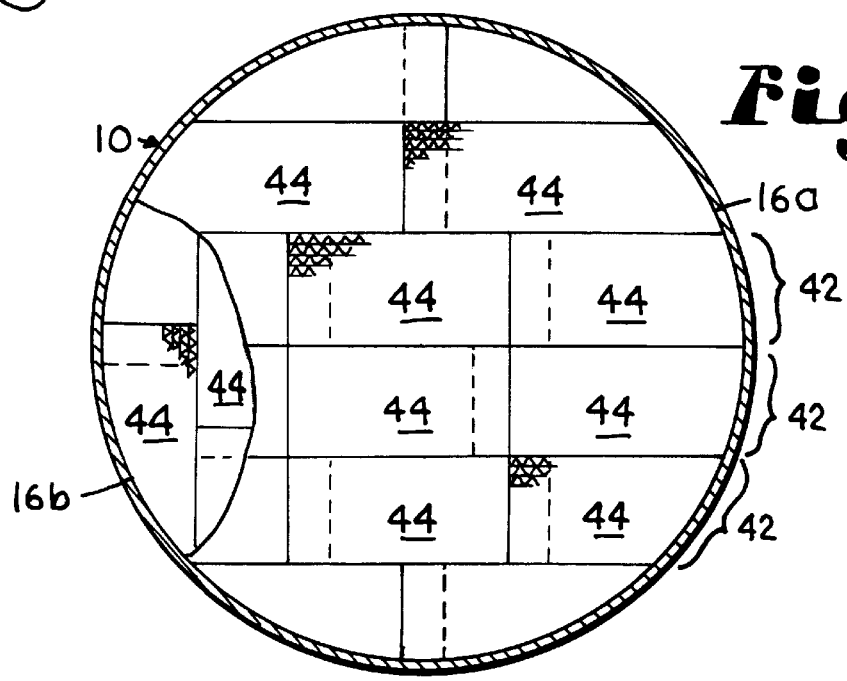
FIG. 7 is a top plan view similar to FIG. 2, but showing the alternative packing brick of FIG. 5 positioned in a layer with the lower edges of the bricks shown in broken lines, and a portion broken away to show the orientation of the lower layer of bricks.

With reference to FIGS. 5–7, an alternative brick configuration 44 is shown. As with brick 18, brick 44 is made of a plurality of plates 20 having corrugations 22. Further, the corrugations of each plate are arranged in a crisscrossing manner to corrugations of adjacent plates, as shown in the broken away portion of FIG. 5. Each brick 44 has upper and lower surfaces 24 and 26, respectively, and side surfaces 28 and 30. Brick 44 further has angled end surfaces 46 and 48. End surfaces 46 and 48 of brick 44 are angled with respect to longitudinal axis 12, and are parallel to one another. This is in contrast to angled end surfaces 32, 34 of bricks 18, which are angled toward one another. In particular, a vertical cross section of brick 44 generally forms a parallelogram, as best shown in FIG. 6. End surfaces 46, 48 also have corrugation openings 40 formed thereon.

As best shown in FIGS. 6 and 7, bricks 44 are also disposed in layers 16 which are made of a plurality of side-by-side rows 42. Each row 42 consist of a plurality of bricks 44 disposed in end-to-end fashion such that the angled end surfaces 46, 48 of adjacent bricks contact one another. As best shown in FIG. 5, each of the end surfaces 46, 48 of bricks 44 are at an angle β with respect to the longitudinal axis 12 of column 10. Openings 40 of an end surface 46 of one brick are disposed above openings 40 of an end surface 48 of an adjacent brick. Therefore, again, this structure allows liquid flowing downwardly within column 10 to be transferred from one brick to an adjacent brick within a layer 16. Bricks 18 in adjacent rows are rotated 180 degrees with respect to each other, as best shown in FIG. 7, to provide more uniform radial flow of liquid. As with bricks 18, the bricks 44 in a layer that are adjacent the outer circumference of column 10 can be specially configured so that the entire cross section of column 10 is covered with bricks 44, as is best shown in FIG. 7. Also, as with bricks 18, adjacent layers 16 of bricks 44 are rotated with respect to one another, as best shown in FIG. 7. In particular, a lower layer 16b is rotated 90 degrees with respect to upper layer 16a.

As with bricks 18, the plates of bricks 44 can be held together in any suitable fashion, such as pins, bolts, mesh strapping, welding or rivets, as is known in the art. Also, as with bricks 18, overlapping angled end surfaces 46, 48 of bricks 44 allow liquid transfer between and close nesting of adjacent bricks, and further prevent channeling of fluid between the bricks as often happened with vertically oriented end surfaces of prior art bricks. Further, the overlapping angled mating between adjacent bricks prevents the vapor from flowing directly upwardly within the column between adjacent bricks, and thus increases the possibility of contact with downwardly flowing liquid. Again, the structure of brick 44 with its angled end surfaces increases the efficiency and decreases the HETP of the column.

As with brick 18, the preferred angle β of end surfaces 46, 48 with respect to longitudinal axis 12 is within the range of approximately 15 to 45 degrees and may be limited by the angle of corrugations in plates 20. This range allows ease of fabrication and assembly of bricks 44 within the column. Larger angles may also be used but are more difficult to install. Smaller angles may also be used but have less effect on efficiency.

It will be appreciated that the improved efficiencies possible with the bricks of the present invention result from the overlapping inclined end surfaces which permit vertical transfer of liquid under the influence of gravity between horizontally adjacent bricks. These inclined surfaces also facilitate the placement of the bricks in close nested contact with each other, thereby eliminating the vertical gaps that may form between conventional bricks and permit undesired vapor or liquid flow along the gaps. Although the invention has been described with respect to the illustrated trapezoid and parallelogram shaped bricks, overlapping inclined end surfaces can be presented by other geometric configurations. These alternative configurations are encompassed by and are within the scope of the present invention.

From the foregoing, it will be seen that this invention is one well-adapted to attain all the ends and objects hereinabove set forth together with other advantages which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

We claim:

1. A structured packing bed for positioning in a column having a longitudinal axis, the bed comprising:

a plurality of bricks, each of said bricks including a plurality of corrugated plates disposed in parallel relation with corrugations in adjacent plates being disposed in criss-crossing relationship, said plates having opposed ends which form end surfaces of the bricks, at least some of said bricks having at least one of said end surfaces disposed at an angle within a range of 15 to 45 degrees to the column longitudinal axis and engaging in a parallel fashion the angled end surface of an adjacent brick.

2. The packing bed of claim 1, wherein at least one of said bricks has both of said end surfaces angled with respect to the column longitudinal axis.

3. The packing bed of claim 2, wherein both of said end surfaces of said at least one brick are generally planar and angled towards one another such that said at least one brick in vertical cross section has a generally trapezoidal shape.

4. The packing bed of claim 2, wherein both of said end surfaces of said at least one brick are generally planar and parallel to one another such that said at least one brick in vertical cross section has a generally parallelogram shape.

5. The packing bed of claim 1, wherein said angle of said at least one end surface to the column axis is either approximately 30 degrees or approximately 45 degrees.

6. A structured packing bed for positioning in a column having a longitudinal axis, the column adapted to have liquid generally flowing downwardly in the column and vapor generally flowing upwardly in the column, the bed comprising:

at least two bricks arranged end to end, each said brick including a plurality of plates disposed in parallel relation and having corrugations formed therein; and means associated with said bricks to aid transfer of liquid from one brick to another and to prevent vapor from flowing directly upward between said bricks, wherein said corrugations of said bricks form openings along end surfaces of said bricks and said transfer means includes the positioning of at least some of said openings of one brick above the openings of a horizontally adjacent brick.

7. A structured packing bed for positioning in a column having a longitudinal axis, the bed comprising:

a plurality of bricks, each of said bricks including a plurality of corrugated plates disposed in parallel relation and having opposed ends forming end surfaces of the bricks, at least some of said bricks having at least one of said end surfaces disposed at an angle to the column longitudinal axis and engaging in a parallel fashion the angled end surface of an adjacent brick, wherein at least one of said bricks has both of said opposite first and second end surfaces angled with respect to the column longitudinal axis, and wherein both of said end surfaces of said at least one brick are generally planar and angled towards one another such that said brick in vertical cross section has a generally trapezoidal shape.

8. The structured packing bed of claim 7, including liquid and vapor flow openings at said end surfaces and formed by corrugations in said plates, and wherein liquid, when present in the packing bed, is able to flow vertically downwardly from the openings in said angled end surface of said at least one brick into underlying openings in said angled end surface of the adjacent brick.

9. At least one structured packing bed positioned within an exchange column having a longitudinal axis, the bed comprising:
   a plurality of bricks, each of said bricks including a plurality of plates disposed in parallel relation and having corrugations formed therein, at least some of said bricks having at least one end surface disposed at an angle to the column longitudinal axis and engaging in a parallel fashion the angled end surface of an adjacent brick,
   wherein said corrugations form openings at the angled end surfaces and liquid, when present in the packing bed, is able to flow vertically downwardly from the openings in the angled end surface of each said brick into underlying openings in said angled end surface of the adjacent bricks.

10. The structured packing bed of claim 9, where in the corrugations of each plate are disposed in crisscrossing relationship to corrugations of adjacent plates.

11. The structured packing bed of claim 9, wherein said bricks have generally vertical sides.

12. The structured packing bed of claim 11, wherein said bricks have generally horizontal upper and lower surfaces.

13. The structured packing bed of claim 12, wherein said column longitudinal axis is generally vertical.

14. The structured packing bed of claim 9, wherein said bricks are positioned in a plurality of side by side rows, with the bricks in each row being positioned end to end.

15. The structured packing bed of claim 14, including a second said structured packing bed positioned vertically adjacent said at least one structured packing bed, said rows of bricks in the at least one structured packing bed extending in one direction and said rows of bricks in the second structured packing bed extending in a different direction.

16. The structured packing bed of claim 15, wherein said angle of said end surface to the column axis is within the range of approximately fifteen to forty-five degrees.

17. The structured packing bed of claim 16, wherein said angle is approximately 30 degrees or approximately 45 degrees and said column axis extends generally vertically.

18. The structured packing bed of claim 14, wherein adjacent bricks are positioned in an alternating right side up, upside down orientation within each row.

19. The structured packing bed of claim 18, wherein adjacent bricks are positioned in an alternating right side up, upside down orientation across adjacent rows.

* * * * *